(12) United States Patent
Aoki

(10) Patent No.: US 7,209,299 B2
(45) Date of Patent: Apr. 24, 2007

(54) VIBRATION REDUCTION ZOOM LENS SYSTEM

(75) Inventor: Misako Aoki, Oyama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/363,084

(22) Filed: Feb. 28, 2006

(65) Prior Publication Data

US 2006/0146418 A1    Jul. 6, 2006

Related U.S. Application Data

(63) Continuation of application No. 10/743,764, filed on Dec. 24, 2003.

(30) Foreign Application Priority Data

Dec. 27, 2002   (JP)   ............................. 2002-381619

(51) Int. Cl.
   *G02B 15/14*     (2006.01)
   *G02B 27/64*     (2006.01)
(52) U.S. Cl. ...................... 359/683; 359/554; 359/557
(58) Field of Classification Search ............... 359/683, 359/554, 557, 676
   See application file for complete search history.

(56) References Cited

U.S. PATENT DOCUMENTS

| 5,040,881 A | 8/1991 | Tsuji ........................... 359/447 |
| 5,270,857 A | 12/1993 | Oizumi et al. ............... 359/554 |
| 5,502,594 A | 3/1996 | Suzuki et al. ............... 359/557 |
| 5,585,966 A | 12/1996 | Suzuki ........................ 359/557 |
| 6,025,962 A | 2/2000 | Suzuki ........................ 359/766 |
| 6,392,816 B1 | 5/2002 | Hamano ..................... 359/683 |
| 6,763,186 B2 | 7/2004 | Hamano ..................... 396/79 |

FOREIGN PATENT DOCUMENTS

| JP | 1-189621 | 7/1989 |
| JP | 1-91113 | 8/1989 |
| JP | 1-191112 | 8/1989 |
| JP | 1-284823 | 11/1989 |
| JP | 6-130330 | 5/1994 |
| JP | 7-199124 | 8/1995 |
| JP | 10-111455 | 4/1998 |

*Primary Examiner*—Scott J. Sugarman
(74) *Attorney, Agent, or Firm*—Miles & Stockbridge PC

(57) ABSTRACT

An object is to provide a vibration reduction (VR) zoom lens system having high optical performance and compactness suitable for an SLR camera, a video camera and the like. The zoom lens system includes, in order from an object, a first lens group having positive refractive power, a second lens group having negative refractive power, a third lens group having positive refractive power, a fourth lens group having negative refractive power, and a fifth lens group having positive refractive power. All distances between adjacent lens groups are changed upon zooming from a wide-angle end state to a telephoto end state. The third lens group includes a plurality of lenses including a cemented lens constructed by a negative lens cemented with a positive lens. Only the cemented lens is used as a vibration reduction lens shifting substantially perpendicularly to the optical axis for correcting camera shake. Given conditional expressions are satisfied.

21 Claims, 12 Drawing Sheets

VIBRATION REDUCTION ZOOM LENS SYSTEM

CROSS-REFERENCE TO RELATED APPLICATION

This application is a continuation of application Ser. No. 10/743,764 filed Dec. 24, 2003.

The disclosures of the following priority application is herein incorporated by reference:

Japanese Patent Application No. 2002-381619 filed Dec. 27, 2002.

BACKGROUND OF THE INVENTION

1. Field of the Invention

The present invention relates to a zoom lens for an SLR camera and a video camera and in particular to a zoom lens having vibration reduction correction.

2. Related Background Art

In order to reduce failure in shooting photograph by camera shake and the like, a zoom lens having vibration reduction correction has come to be used.

Conventional zoom lenses having vibration reduction correction are composed of two or more lens groups carry out vibration reduction correction by moving any lens group perpendicularly to the optical axis (for example, Japanese Patent Application Laid-Open Nos. 1-189621, 1-191112, 1-119113).

A zoom lens disclosed in Japanese Patent Application Laid-Open No. 1-284823 carries out vibration reduction correction by moving a portion of a first lens group that is fixed upon zooming perpendicularly to the optical axis.

Moreover, zoom lenses disclosed in Japanese Patent Application Laid-Open Nos. 7-199124 and 10-111455 carry out vibration reduction correction by moving a third lens group perpendicularly to the optical axis.

Furthermore, a zoom lens disclosed in Japanese Patent Application Laid-Open No. 6-130330 carries out vibration reduction correction by moving a fourth lens group perpendicularly to the optical axis.

However, those conventional vibration reduction (VR) zoom lenses described above are not suitable for an SLR camera or a video camera or have inconvenience to become mechanically large and complicated.

SUMMARY OF THE INVENTION

The present invention is made in view of the aforementioned problems and has an object to provide a vibration reduction zoom lens system suitable for an SLR camera and a video camera having high optical performance and compactness by applying only a cemented lens as a vibration reduction (VR) lens to make it compact and lightweight.

According to one aspect of the present invention, a vibration reduction zoom lens system includes, in order from an object, a first lens group having positive refractive power, a second lens group having negative refractive power, a third lens group having positive refractive power, a fourth lens group having negative refractive power, and a fifth lens group having positive refractive power. All distances between adjacent lens groups are changed upon zooming from a wide-angle end state to a telephoto end state. The third lens group includes a plurality of lenses including a cemented lens constructed by a negative lens cemented with a positive lens. Only the cemented lens is used as a vibration reduction lens shifting substantially perpendicularly to the optical axis for correcting camera shake. The following conditional expression (1) is satisfied:

$$0.6 < |f3A|/|f3| < 2.6 \quad (1)$$

where f3A denotes the focal length of the vibration reduction lens of the third lens group, and f3 denotes the focal length of the third lens group.

In one preferred embodiment of the present invention, the following conditional expression (2) is preferably satisfied:

$$0.10 < |N3AN - N3AP| \quad (2)$$

where N3An denotes a refractive index of a medium of the negative lens of the vibration reduction lens at d-line ($\lambda=587.6$ nm), and N3AP denotes a refractive index of a medium of the positive lens of the vibration reduction lens at d-line ($\lambda=587.6$ nm).

In one preferred embodiment of the present invention, the following conditional expression (3) is preferably satisfied:

$$-0.50 < (R2+R1)/(R2-R1) < 0.50 \quad (3)$$

where R1 denotes a radius of curvature of the most object side lens surface of the vibration reduction lens, and R2 denotes a radius of curvature of the most image side lens surface of the vibration reduction lens.

In one preferred embodiment of the present invention, the following conditional expression (4) is preferably satisfied:

$$3.0 < FT \cdot f1/fT < 5.5 \quad (4)$$

where fT denotes the focal length of the vibration reduction zoom lens system in the telephoto end state, f1 denotes the focal length of the first lens group, and FT denotes the f-number of the vibration reduction zoom lens system in the telephoto end state.

In one preferred embodiment of the present invention, the following conditional expression (5) is preferably satisfied:

$$0.40 < |f2|/fW < 0.80 \quad (5)$$

where fW denotes the focal length of the vibration reduction zoom lens system in the wide-angle end state, and f2 denotes the focal length of the second lens group.

Other features and advantages according to the invention will be readily understood from the detailed description of the preferred embodiment in conjunction with the accompanying drawings.

DESCRIPTION OF THE PREFERRED EMBODIMENTS

Figure 1:
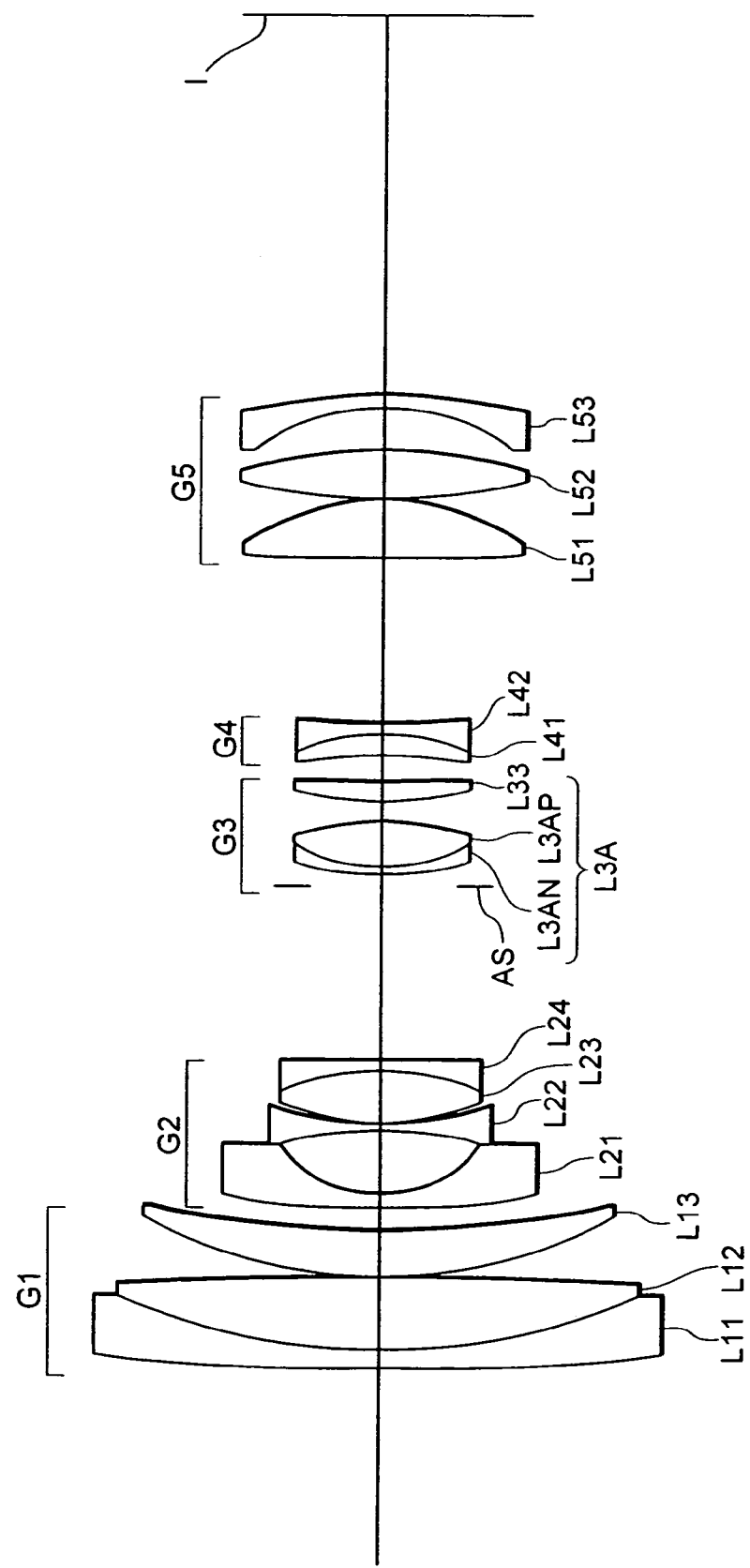
FIG. 1 is a diagram showing the lens arrangement of a vibration reduction zoom lens system according to Example 1 of the present invention.

Embodiments of the present invention are going to be explained below with reference to accompanying drawings.

The vibration reduction zoom lens system is composed of, in order from an object, a first lens group G1 having positive refractive power, a second lens group G2 having negative refractive power, a third lens group G3 having positive refractive power, a fourth lens group G4 having negative refractive power, and a fifth lens group G5 having positive refractive power.

When the state of lens group positions varies from a wide-angle end state to a telephoto end state, a distance between the first lens group G1 and the second lens group G2 increases, a distance between the second lens group G2 and the third lens group G3 decreases, a distance between the third lens group G3 and the fourth lens group G4 increases, and a distance between the fourth lens group G4 and the fifth lens group G5 decreases.

The second lens group G2 is moved along the optical axis upon focusing.

It is generally preferable that a vibration reduction (VR) lens group that is shifted from the optical axis for vibration reduction correction is compact and lightweight having small shift amount from the optical axis for vibration reduction correction. This is for making the holding and driving mechanism to be compact and for reducing power consumption. In order to suppress deterioration of optical performance upon vibration reduction correction as much as possible, it is preferable that the vibration reduction lens group is a lens group in which off-axis light rays pass through as near as possible to the optical axis through entire zoom range. Accordingly, it is preferable that a lens group locating in the vicinity of the aperture stop is adopted as the vibration reduction lens group.

In order to satisfy these conditions, in the present invention, the most suitable lens group for the vibration reduction lens group is the cemented lens L3A of the third lens group G3 locating in the vicinity of the aperture stop, having a small diameter and large refractive power, and capable of lowering the shifting amount from the optical axis.

In the present invention, the cemented lens L3A (hereinafter called "vibration reduction lens L3A") is preferably satisfies the following conditional expression (1):

$$0.6 < |f3A|/|f3| < 2.6 \qquad (1)$$

where f3A denotes the focal length of the vibration reduction lens L3A in the third lens group G3 and f3 denotes the focal length of the third lens group G3.

Conditional expression (1) defines an appropriate range of power distribution between the vibration reduction lens L3A and the third lens group G3.

When the ratio $|f3A|/|f3|$ is equal to or exceeds the upper limit of conditional expression (1), the decentering amount of the vibration reduction lens L3A relative to the optical axis becomes large, so that the holding and driving mechanism becomes large and power consumption also becomes large.

On the other hand, when the ratio $|f3A|/|f3|$ is equal to or falls below the lower limit of conditional expression (1), Petzval sum of the vibration reduction lens L3A becomes large, so that optical performance upon vibration reduction deteriorates severely.

In order to bring the effect of the present invention into full play, it is preferable to set the upper limit of conditional expression (1) to 2.1 and the lower limit to 1.1.

In the present invention, the vibration reduction lens L3A is a cemented lens constructed by a negative lens L3AN cemented with a positive lens L3AP. This is because it is necessary to suppress production of aberration at the vibration reduction lens L3A in order to maintain good optical performance upon vibration reduction. Accordingly, by applying the above-described cemented lens, production of aberrations including chromatic aberration upon vibration reduction can be reduced.

In the present invention, the negative lens L3AN and the positive lens L3AP composing the vibration reduction lens L3A preferably satisfy the following conditional expression (2):

$$0.10 < |N3AN - N3AP| \qquad (2)$$

where N3AN denotes the refractive index of the negative lens L3AN in the vibration reduction lens L3A at d-line ($\lambda$=587.6 nm) and N3AP denotes the refractive index of the positive lens L3AP in the vibration reduction lens L3A at d-line ($\lambda$=587.6 nm).

Conditional expression (2) defines an appropriate range of the difference of refractive index of the negative lens L3AN to that of the positive lens L3AP of the vibration reduction lens L3A at d-line ($\lambda$=587.6 nm).

When the value $|N3AN-N3AP|$ is equal to or falls below the lower limit of conditional expression (2), although chromatic aberration can be corrected upon vibration reduction, in various aberrations other than chromatic aberration, degree of freedom for correcting aberrations is small because difference of refractive index at d-line is small. Accordingly, optical performance deteriorates upon vibration reduction, so it is undesirable.

In the present invention, the following conditional expression (3) is preferably satisfied:

$$-0.50<(R2+R1)/(R2-R1)<0.50 \quad (3)$$

where R1 denotes the radius of curvature of the most object side lens surface of the vibration reduction lens L3A and R2 denotes the radius of curvature of the most image side lens surface of the vibration reduction lens L3A.

Conditional expression (3) defines an appropriate range of the shape factor of the vibration reduction lens L3A. It is necessary that production of aberration of the vibration reduction lens while not performing vibration reduction correction should be as small as possible, and the deviation angle between on-axis incident light and on-axis exit light passing through the vibration reduction lens L3A varies as little as possible while performing vibration reduction correction. This is for suppressing the difference of production of aberration between while performing vibration reduction correction and while not performing vibration reduction correction in order to reduce degradation of optical performance upon performing vibration reduction correction.

When the ratio (R2+R1)/(R2−R1) is out of the scope of conditional expression (3), in other words equal to or exceeds the upper limit, or equal to or falls below the lower limit of conditional expression (3), the deviation angle between the incident light and the exit light of on axis light passing through the vibration reduction lens L3A varies largely upon vibration reduction correction. Accordingly, production of aberrations upon vibration reduction correction becomes large, so that high optical performance cannot be obtained upon vibration reduction correction.

In the present invention, the following conditional expression (4) is preferably satisfied:

$$3.0<FT \cdot f1/fT<5.5 \quad (4)$$

where fT denotes the focal length of the vibration reduction zoom lens system in the telephoto end state, f1 denotes the focal length of the first lens group G1, and FT denotes the f-number of the vibration reduction zoom lens system in the telephoto end state.

Conditional expression (4) defines an appropriate range of the speed (apparent f-number) of the first lens group G1 in the telephoto end state.

When the value is equal to or exceeds the upper limit of conditional expression (4), the focal length of the first lens group G1 becomes extremely long. Accordingly, the moving amount of the first lens group G1 when zooming from the wide-angle end state to the telephoto end state becomes too long, so that compactness and lightweight cannot be accomplished.

On the other hand, when the value FT·f1/fT is equal to or falls below the lower limit of conditional expression (4), the focal length of the first lens group G1 becomes too short. Accordingly, variation in various aberrations upon zooming cannot be suppressed causing degradation of optical performance.

In the present invention, the following conditional expression (5) is preferably satisfied:

$$0.40<|f2|/fW<0.80 \quad (5)$$

where fW denotes the focal length of the vibration reduction zoom lens system in the wide-angle end state, and f2 denotes the focal length of the second lens group G2.

Conditional expression (5) defines an appropriate range of the ratio of the focal length of the second lens group G2 to that of the vibration reduction zoom lens system in the wide-angle end state.

When the ratio |f2|/fW is equal to or exceeds the upper limit of conditional expression (5), it becomes difficult to secure a required sufficient back focal length in the wide-angle end state.

On the other hand, when the ratio |f2|/fW is equal to or falls below the lower limit of conditional expression (5), the lens diameters of the third lens group G3, the fourth lens group G4, and the fifth lens group G5 locating to the image side of the second lens group G2 become large, so it becomes difficult to be compact and lightweight.

In the present invention, when carrying out vibration reduction correction, the method to rotate (tilt) the vibration reduction lens L3A around a position on the optical axis can be used.

In the present invention, only dioptric lens is used. However, it is needless to say that a diffractive optical element, a graded index lens, or the like may be used.

EXAMPLE 1

FIG. 1 is a diagram showing the lens arrangement of a vibration reduction zoom lens system according to Example 1 of the present invention.

In a vibration reduction zoom lens system according to Example 1 of the present invention, the first lens group G1 is composed of, in order from the object, a cemented lens constructed by a negative meniscus lens L11 having a convex surface facing to the object and a double convex positive lens L12, and a positive meniscus lens L13 having a convex surface facing to the object.

The second lens group G2 is composed of, in order from the object, a negative meniscus lens L21 having a convex surface facing to the object, a double concave negative lens L22, a double convex positive lens L23, and a negative meniscus lens L24 having a concave surface facing to the object.

The third lens group G3 is composed of, in order from the object, an aperture stop AS, a cemented lens L3A constructed by a negative meniscus lens L3AN and a double convex positive lens L3AP, and a positive meniscus lens L33 having a convex surface facing to the object.

The fourth lens group G4 is composed of, in order from the object, a positive meniscus lens L41 having a concave surface facing to the object, and a double concave negative lens L42.

The fifth lens group G5 is composed of, in order from the object, a double convex positive lens L51, a double convex positive lens L52, and a negative meniscus lens L53 having a concave surface facing to the object.

Various values according to Example 1 are shown in Table 1.

In Specifications, f denotes the focal length, FNO denotes f-number, 2W denotes the maximum value of the angle of view (unit: degree).

In Lens Data, the left most column is a surface number of a lens surface counted in order from the object, R denotes a radius of curvature of a lens surface, D denotes a distance to the adjacent lens surface, υd denotes Abbe number of the medium, Nd denotes a refractive index of the medium at d-line (λ=587.6 nm). Bf denotes the back focal length. An aspherical surface is denoted by an asterisk (*) attached to the surface number.

In each Example, an aspherical surface is represented by the following expression:

$$x = cy^2/[1+(1-kc^2y^2)^{1/2}] + C_4y^4 + C_6y^6 + C_8y^8 + C_{10}y^{10} + C_{12}y^{12}$$

where y denotes the height from the optical axis, x denotes sag amount, c denotes a reference curvature (=1/R), k denotes the conical coefficient, $C_4$ denotes the 4th order aspherical coefficient, $C_6$ denotes the 6th order aspherical coefficient, $C_8$ denotes the 8th order aspherical coefficient, $C_{10}$ denotes the 10th order aspherical coefficient, $C_{12}$ denotes the 12th order aspherical coefficient.

In Aspherical Data, "E-n" denotes "$10^{-n}$".

In Various Values upon vibration reduction Correction, the moving amounts of the vibration reduction lens and the image are positive when the movement is upper than the optical axis in each drawing showing the lens construction.

In each Example shown below, the same reference symbols as Example 1 are used.

In the tables for various values, "mm" is generally used for the unit of length such as the focal length, the radius of curvature, and the separation between optical surfaces. However, since an optical system proportionally enlarged or reduced its dimension can be obtained similar optical performance, the unit is not necessary to be limited to "mm" and any other suitable unit can be used. The explanation of reference symbols is the same in the other example.

TABLE 1

[Specification]

f = 24.720–116.500 mm
FNO = 3.601–5.627
2ω = 83.58°–20.29°

[Lens Data]

| | r | d | ν | N(d) |
|---|---|---|---|---|
| 1) | 242.1205 | 1.9000 | 23.78 | 1.846660 |
| 2) | 64.7339 | 7.3000 | 52.32 | 1.755000 |
| 3) | −1831.6851 | 0.1000 | | 1.000000 |
| 4) | 47.9741 | 4.8000 | 46.63 | 1.816000 |
| 5) | 104.4072 | d5 | | 1.000000 |
| *6) | 78.9037 | 0.2000 | 38.09 | 1.553890 |
| 7) | 78.9037 | 1.1500 | 42.72 | 1.834810 |
| 8) | 13.0924 | 6.6000 | | 1.000000 |
| 9) | −48.8888 | 0.9000 | 42.72 | 1.834810 |
| 10) | 38.2686 | 0.1000 | | 1.000000 |
| 11) | 25.4358 | 5.3000 | 25.41 | 1.805182 |
| 12) | −27.7531 | 0.1600 | | 1.000000 |
| 13) | −25.7724 | 0.9000 | 42.72 | 1.834810 |
| 14) | −9999.0000 | d14 | | 1.000000 |
| 15) | 32.4485 | 0.8000 | 25.41 | 1.805182 |
| 16) | 18.3178 | 4.6000 | 81.61 | 1.497000 |
| 17) | −31.0784 | 2.0000 | | 1.000000 |
| 18) | 27.6876 | 2.2000 | 70.24 | 1.487490 |
| 19) | 229.3722 | d19 | | 1.000000 |
| 20) | −68.9111 | 2.5000 | 23.78 | 1.846660 |
| 21) | −20.4254 | 0.1000 | | 1.000000 |
| 22) | −19.5549 | 0.8000 | 42.72 | 1.834810 |
| 23) | 98.5615 | d23 | | 1.000000 |
| 24) | 232.6091 | 6.2000 | 81.61 | 1.497000 |
| 25) | −24.6231 | 0.1000 | | 1.000000 |
| 26) | 60.7408 | 4.8000 | 70.24 | 1.487490 |
| 27) | −56.4358 | 4.5552 | | 1.000000 |
| 28) | −23.4921 | 1.1000 | 23.78 | 1.846660 |
| 29) | −71.5684 | Bf | | 1.000000 |

TABLE 1-continued (Aspherical Data)
Surface Number 6

κ = −5.6933
$C_4$ = 4.7040E-6
$C_6$ = 2.1667E-9
$C_8$ = −5.2564E-11
$C_{10}$ = 1.0480E-13
$C_{12}$ = 0.0000

[Variable Distance upon Zooming (focusing at infinity)]

| f | 24.720 | 70.000 | 116.500 |
|---|---|---|---|
| d5 | 2.1726 | 22.1435 | 34.7219 |
| d14 | 19.3969 | 6.5646 | 2.6583 |
| d19 | 2.5585 | 15.4829 | 18.5624 |
| d23 | 17.0465 | 4.1222 | 1.0426 |
| Bf | 38.0791 | 51.0035 | 54.0830 |

[Various Values upon VR Correction]

| | 24.72 mm | 70 mm | 116.5 mm |
|---|---|---|---|
| f | | | |
| VR Lens Shift Amount (mm) | 0.3 | 0.3 | 0.3 |
| Image Shift (mm) | 0.408 | 0.595 | 0.651 |

[Values for the Conditional Expressions]

N3AN = 1.805182
N3AP = 1.497000
R1 = 32.448
R2 = −31.078
fW = 24.720
fT = 116.500
f1 = 83.542
f2 = −14.935
f3 = 26.381
f3A = 42.392
FT = 5.627
(1) |f3A|/|f3| = 1.607
(2) |N3AN − N3AP| = 0.308182
(3) (R2 + R1)/(R2 − R1) = −0.022
(4) FT · f1/fT = 4.035
(5) |f2|/fW = 0.604

Figure 2A:
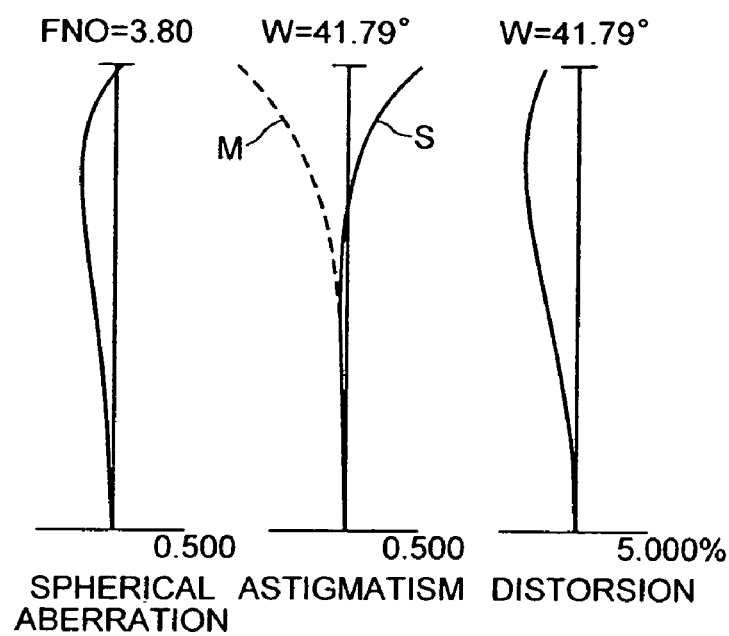
FIGS. 2A and 2B graphically show various aberrations of the vibration reduction zoom lens system according to Example 1 in a wide-angle end state when the zoom lens is focused at infinity, without and with vibration reduction correction, respectively.
Figure 2B:
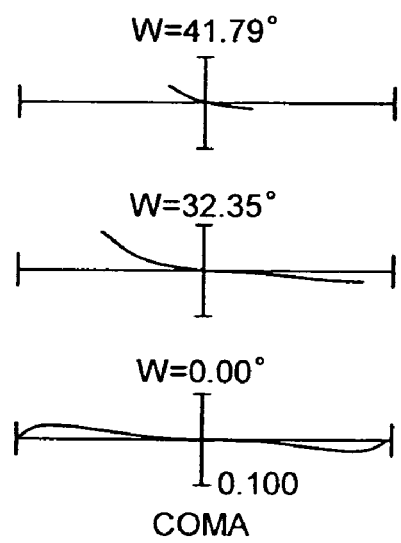
Figure 2B:
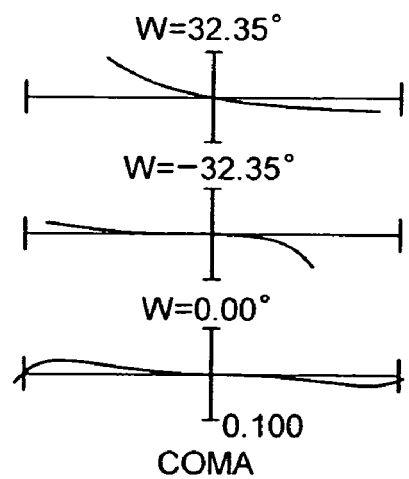
Figure 3A:
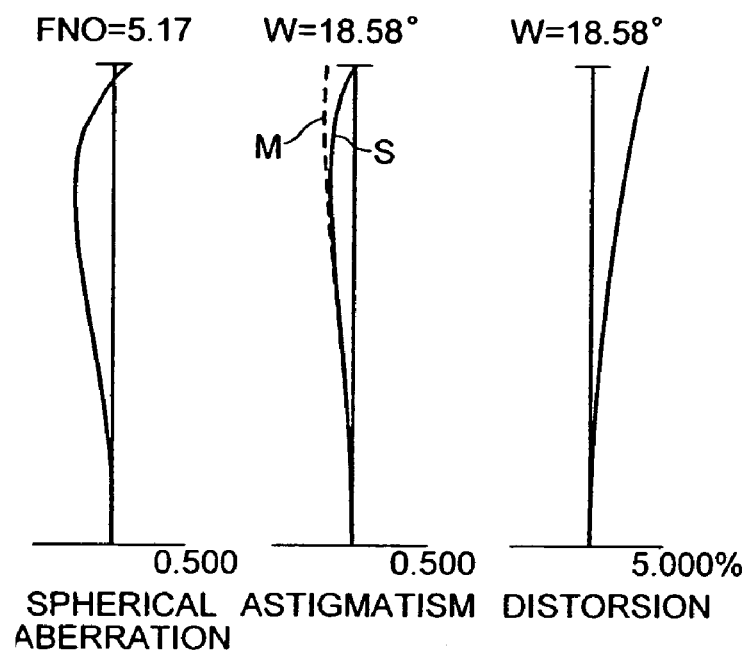
FIGS. 3A and 3B graphically show various aberrations of the vibration reduction zoom lens system according to Example 1 in a intermediate focal length state when the zoom lens is focused at infinity, without and with vibration reduction correction, respectively.
Figure 3B:
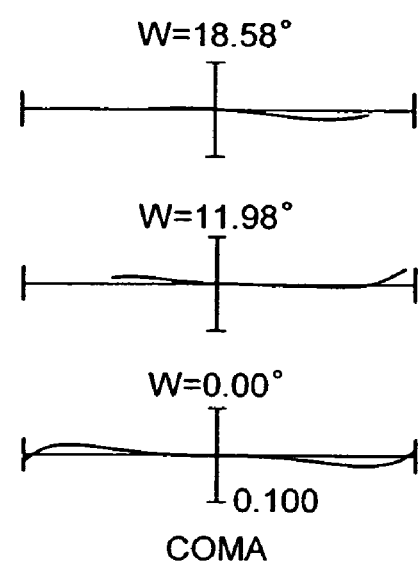
Figure 3B:
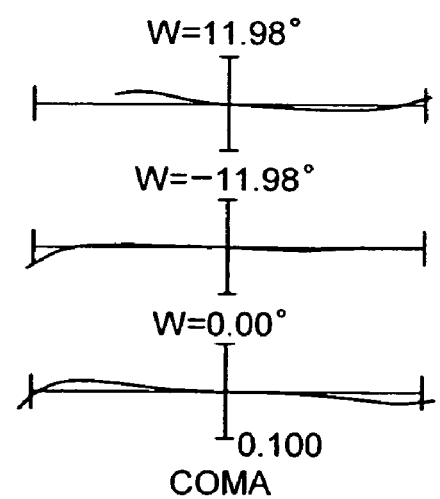
Figure 4A:
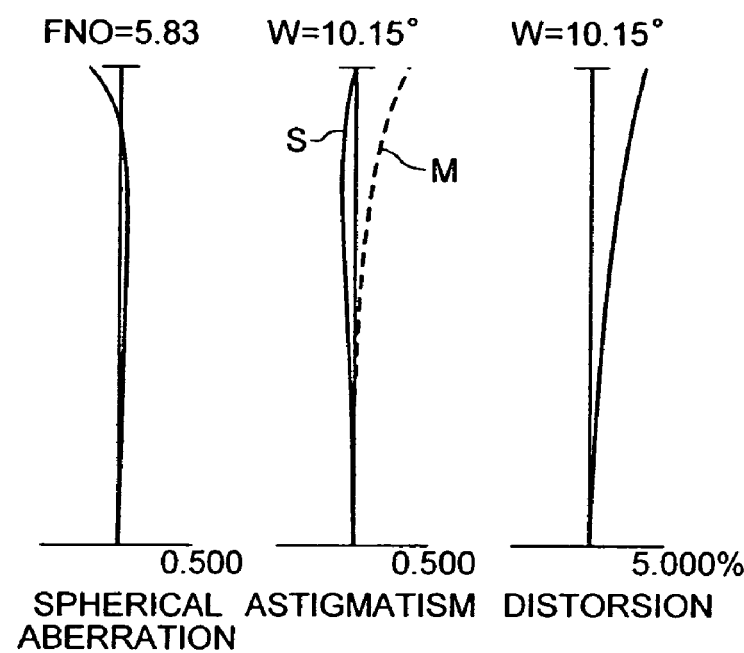
FIGS. 4A and 4B graphically show various aberrations of the vibration reduction zoom lens system according to Example 1 in a telephoto end state when the zoom lens is focused at infinity, without and with vibration reduction correction, respectively.
Figure 4B:
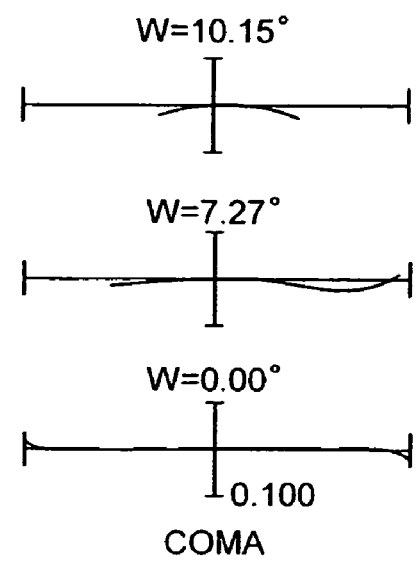
Figure 4B:
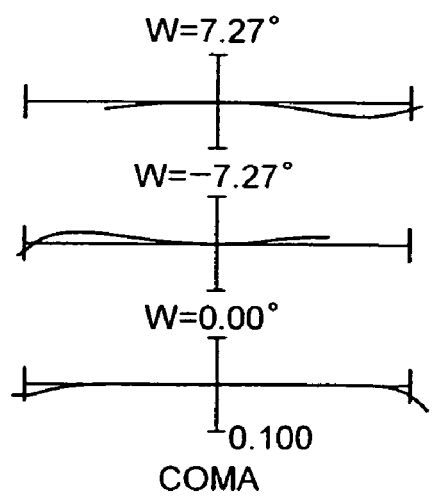

FIGS. 2, 3 and 4 graphically show various aberrations of the vibration reduction zoom lens system according to Example 1 at d-line (λ=587.6 nm).

FIGS. 2A and 2B graphically show various aberrations of the vibration reduction zoom lens system according to Example 1 in a wide-angle end state when the zoom lens is focused at infinity, without and with vibration reduction correction, respectively.

FIGS. 3A and 3B graphically show various aberrations of the vibration reduction zoom lens system according to Example 1 in an intermediate focal state when the zoom lens is focused at infinity, without and with vibration reduction correction, respectively.

FIGS. 4A and 4B graphically show various aberrations of the vibration reduction zoom lens system according to Example 1 in a telephoto end state when the zoom lens is focused at infinity, without and with vibration reduction correction, respectively.

In graphs for various aberrations, FNO denotes the f-number. W denotes a half angle of view. In the diagrams showing spherical aberration, FNO denotes f-number with respect to the maximum aperture. In the diagrams showing astigmatism and distortion, W denotes the maximum value of a half angle of view. In the diagrams showing coma, W denotes each half angle of view. In the diagrams showing astigmatism, S indicates a sagittal image plane and M indicates a meridional image plane. The explanation regarding aberration graphs is the same in the following Examples.

As is apparent from the respective graphs, the vibration reduction zoom lens system according to Example 1 shows superb optical performance as a result of good corrections to various aberrations in each focal length state (the wide-angle end state, the intermediate focal length state, and the telephoto end state) with and without vibration reduction correction.

EXAMPLE 2

Figure 5:
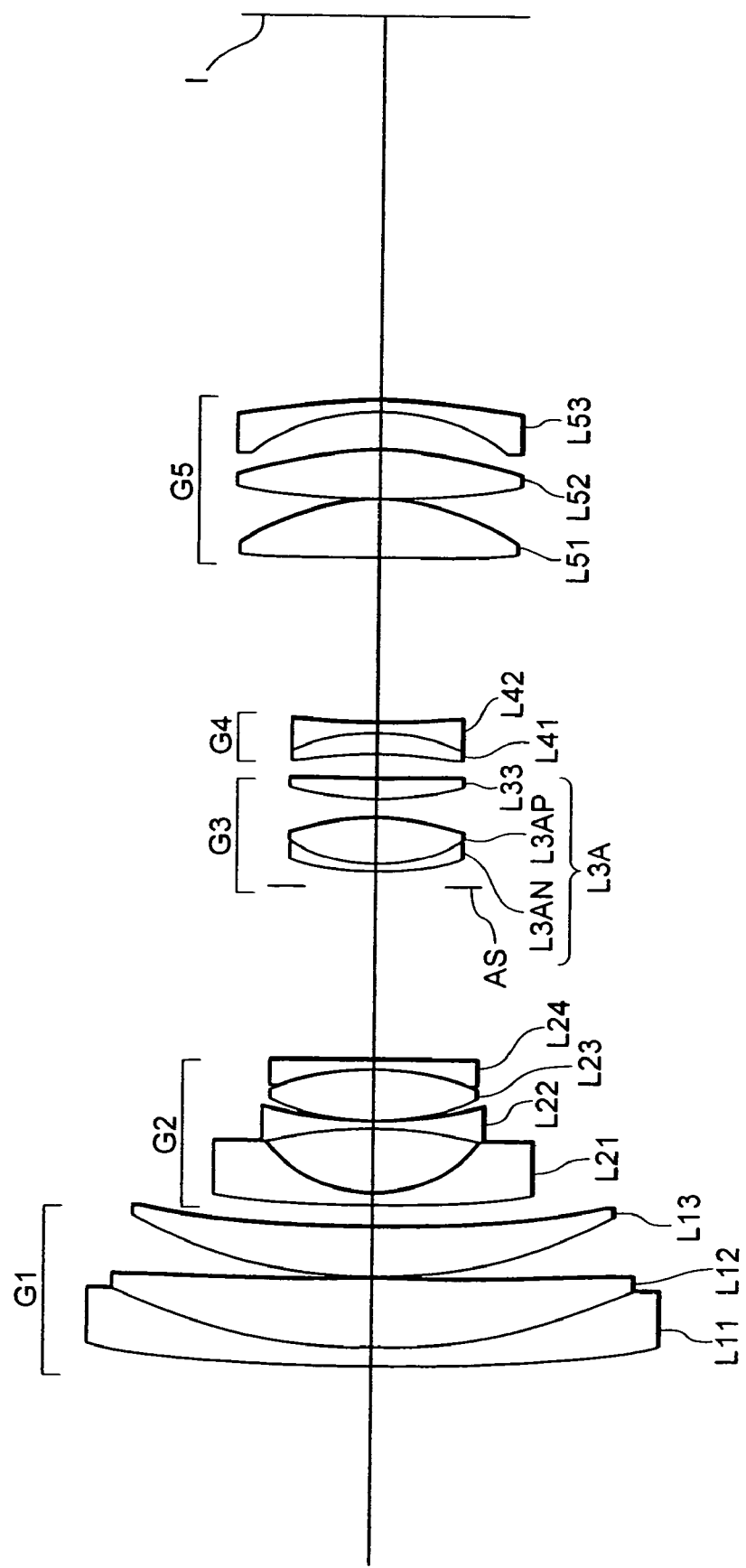
FIG. 5 is a diagram showing the lens arrangement of a vibration reduction zoom lens system according to Example 2 of the present invention.

FIG. 5 is a diagram showing the lens arrangement of a vibration reduction zoom lens system according to Example 2 of the present invention.

In a vibration reduction zoom lens system according to Example 2 of the present invention, the first lens group G1 is composed of, in order from the object, a cemented lens constructed by a negative meniscus lens L11 having a convex surface facing to the object and a positive meniscus lens L12 having a convex surface facing to the object, and a positive meniscus lens L13 having a convex surface facing to the object.

The second lens group G2 is composed of, in order from the object, a negative meniscus lens L21 having a convex surface facing to the object, a double concave negative lens L22, a double convex positive lens L23, and a negative meniscus lens L24 having a concave surface facing to the object.

The third lens group G3 is composed of, in order from the object, an aperture stop AS, a cemented lens L3A constructed by a negative meniscus lens L3AN and a double convex positive lens L3AP, and a positive meniscus lens L33 having a convex surface facing to the object.

The fourth lens group G4 is composed of, in order from the object, a positive meniscus lens L41 having a concave surface facing to the object, and a double concave negative lens L42.

The fifth lens group G5 is composed of, in order from the object, a double convex positive lens L51, a double convex positive lens L52, and a negative meniscus lens L53 having a concave surface facing to the object.

Various values according to Example 2 are shown in Table 2.

TABLE 2

[Specification]

f = 24.720 mm–116.500 mm
FNO = 3.604–5.903
2ω = 85.16°–20.24°

[Lens Data]

| | r | d | ν | N(d) |
|---|---|---|---|---|
| 1) | 187.4154 | 1.9000 | 23.78 | 1.846660 |
| 2) | 60.4398 | 7.1000 | 52.32 | 1.755000 |
| 3) | 809.3772 | 0.1000 | | 1.000000 |
| 4) | 51.1110 | 4.9000 | 46.63 | 1.816000 |
| 5) | 131.2200 | d5 | | 1.000000 |
| *6) | 122.6470 | 0.2000 | 38.09 | 1.553890 |
| 7) | 122.6470 | 1.1500 | 42.72 | 1.834810 |
| 8) | 13.7545 | 6.5000 | | 1.000000 |
| 9) | −54.5024 | 0.9000 | 42.72 | 1.834810 |
| 10) | 40.4384 | 0.1000 | | 1.000000 |
| 11) | 26.0771 | 5.3500 | 25.68 | 1.784720 |
| 12) | −26.6656 | 0.1300 | | 1.000000 |
| 13) | −25.0155 | 0.9000 | 42.72 | 1.834810 |
| 14) | −9999.0000 | d14 | | 1.000000 |
| 15) | 32.4485 | 0.8000 | 25.41 | 1.805182 |
| 16) | 18.3178 | 4.6000 | 81.61 | 1.497000 |
| 17) | −31.0784 | 2.0000 | | 1.000000 |
| *18) | 27.2189 | 2.2000 | 64.10 | 1.516800 |
| 19) | 143.4442 | d19 | | 1.000000 |
| 20) | −69.6687 | 2.5000 | 23.78 | 1.846660 |
| 21) | −19.9954 | 0.1000 | | 1.000000 |
| 22) | −19.1927 | 0.8000 | 42.72 | 1.834810 |
| 23) | 95.9919 | d23 | | 1.000000 |
| 24) | 172.0254 | 6.0000 | 81.61 | 1.497000 |
| 25) | −25.0691 | 0.1000 | | 1.000000 |
| 26) | 73.9596 | 4.9000 | 70.24 | 1.487490 |
| 27) | −45.8950 | 4.2246 | | 1.000000 |
| 28) | −22.8090 | 1.1000 | 23.78 | 1.846660 |
| 29) | −68.9305 | Bf | | 1.000000 |

(Aspherical Data)

Surface Number 6

$\kappa = -6.2822$
$C_4 = 4.4929\text{E-}6$
$C_6 = 7.4142\text{E-}10$
$C_8 = -4.2168\text{E-}11$
$C_{10} = 1.1193\text{E-}13$
$C_{12} = 7.0252\text{E-}18$ Surface Number 18

$\kappa = 1.0063$
$C_4 = -9.6879\text{E-}7$
$C_6 = 2.1207\text{E-}8$
$C_8 = -3.8609\text{E-}10$
$C_{10} = 2.7728\text{E-}12$
$C_{12} = 0.0000$

[Variable Distance upon Zooming (focusing at infinity)]

| f | 24.720 | 70.000 | 116.500 |
|---|---|---|---|
| d5 | 2.1554 | 21.8110 | 34.7047 |
| d14 | 19.4169 | 6.5437 | 2.6783 |
| d19 | 2.5228 | 15.6452 | 18.5267 |
| d23 | 16.8651 | 3.7427 | 0.8612 |
| Bf | 38.5116 | 51.6341 | 54.5154 |

[Various Values upon VR Correction]

| f | 24.72 mm | 70 mm | 116.5 mm |
|---|---|---|---|
| VR Lens Shift Amount (mm) | 0.3 | 0.3 | 0.3 |
| Image Shift (mm) | 0.408 | 0.600 | 0.652 |

[Values for the Conditional Expressions]

N3AN = 1.805182
N3AP = 1.497000
R1 = 32.448
R2 = −31.078
fW = 24.720
fT = 116.500
f1 = 83.542
f2 = −14.935
f3 = 26.381
f3A = 42.392
FT = 5.903
(1) |f3A|/|f3| = 1.607
(2) |N3AN − N3AP| = 0.308182
(3) (R2 + R1)/(R2 − R1) = −0.022
(4) FT · f1/fT = 4.233
(5) |f2|/fW = 0.604

Figure 6A:
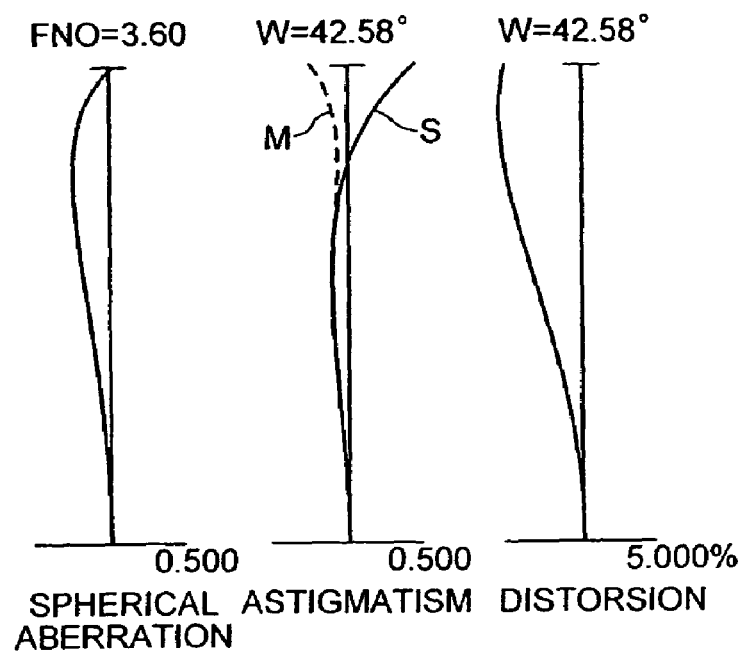
FIGS. 6A and 6B graphically show various aberrations of the vibration reduction zoom lens system according to Example 2 in the wide-angle end state when the zoom lens is focused at infinity, without and with vibration reduction correction, respectively.
Figure 6B:
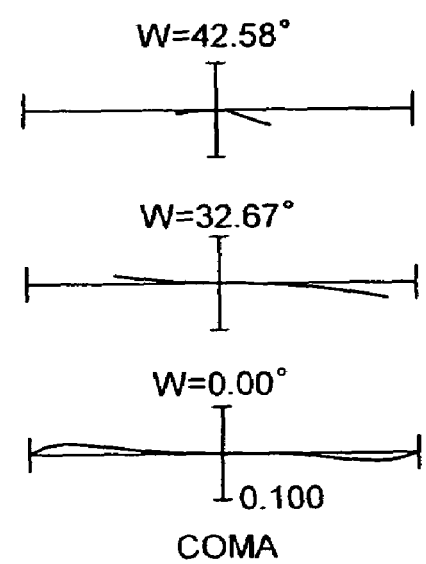
Figure 6B:
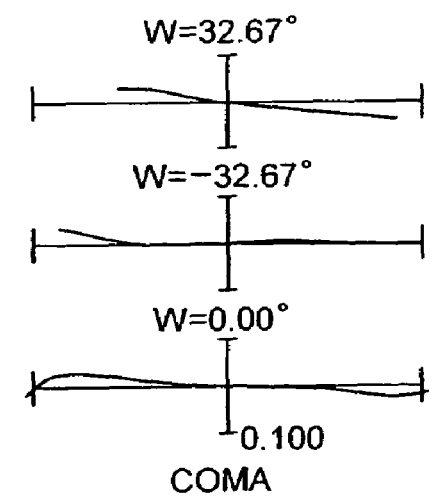
Figure 7A:
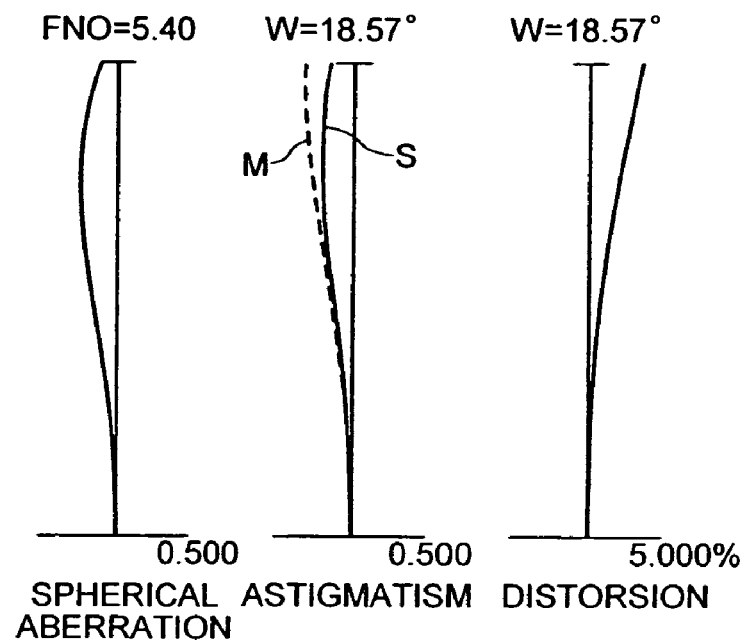
FIGS. 7A and 7B graphically show various aberrations of the vibration reduction zoom lens system according to Example 2 in the intermediate focal length state when the zoom lens is focused at infinity, without and with vibration reduction correction, respectively.
Figure 7B:
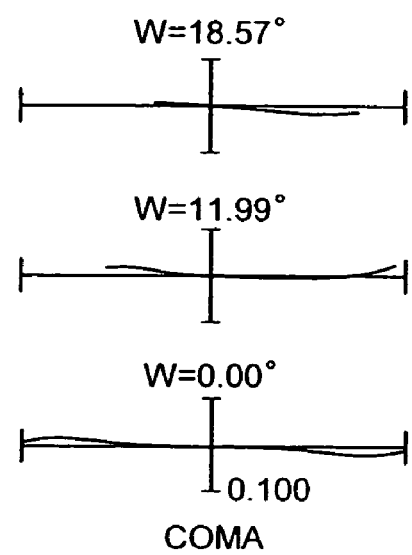
Figure 7B:
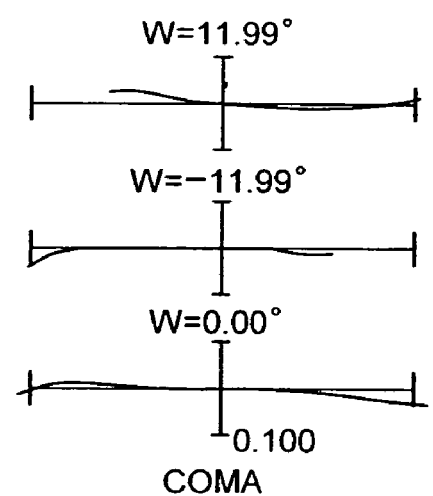
Figure 8A:
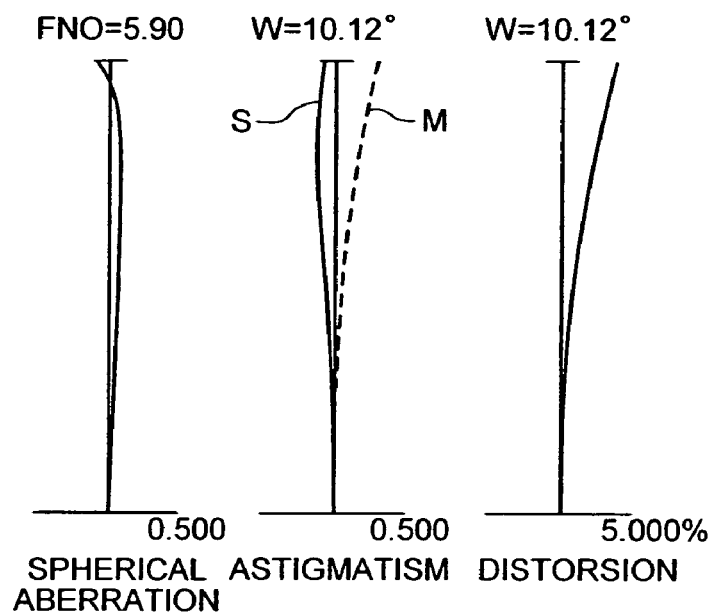
FIGS. 8A and 8B graphically show various aberrations of the vibration reduction zoom lens system according to Example 2 in the telephoto end state when the zoom lens is focused at infinity, without and with vibration reduction correction, respectively.
Figure 8B:
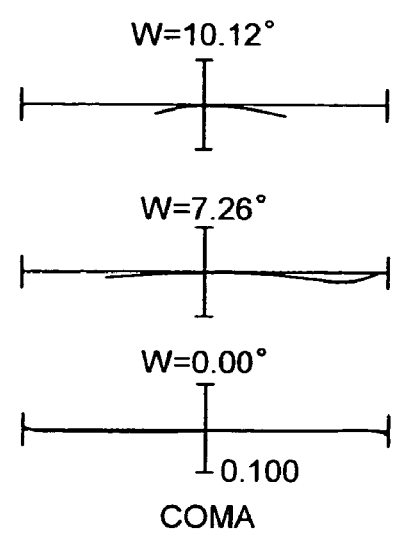
Figure 8B:
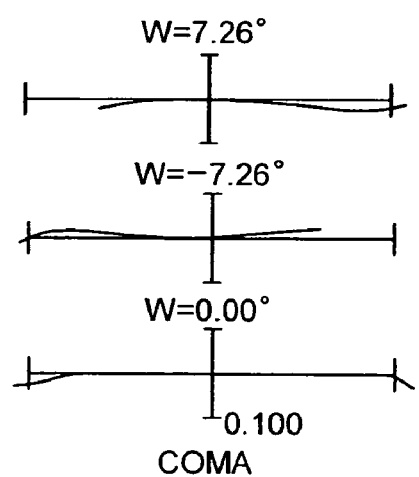

FIGS. 6, 7 and 8 graphically show various aberrations of the vibration reduction zoom lens system according to Example 2 at d-line (λ=587.6 nm).

FIGS. 6A and 6B graphically show various aberrations of the vibration reduction zoom lens system according to Example 2 in a wide-angle end state when the zoom lens is focused at infinity, without and with vibration reduction correction, respectively.

FIGS. 7A and 7B graphically show various aberrations of the vibration reduction zoom lens system according to Example 2 in an intermediate focal state when the zoom lens is focused at infinity, without and with vibration reduction correction, respectively.

FIGS. 8A and 8B graphically show various aberrations of the vibration reduction zoom lens system according to Example 2 in a telephoto end state when the zoom lens is focused at infinity, without and with vibration reduction correction, respectively.

As is apparent from the respective graphs, the vibration reduction zoom lens system according to Example 2 shows superb optical performance as a result of good corrections to various aberrations in each focal length state (the wide-angle end state, the intermediate focal length state, and the telephoto end state) with and without vibration reduction correction.

EXAMPLE 3

Figure 9:
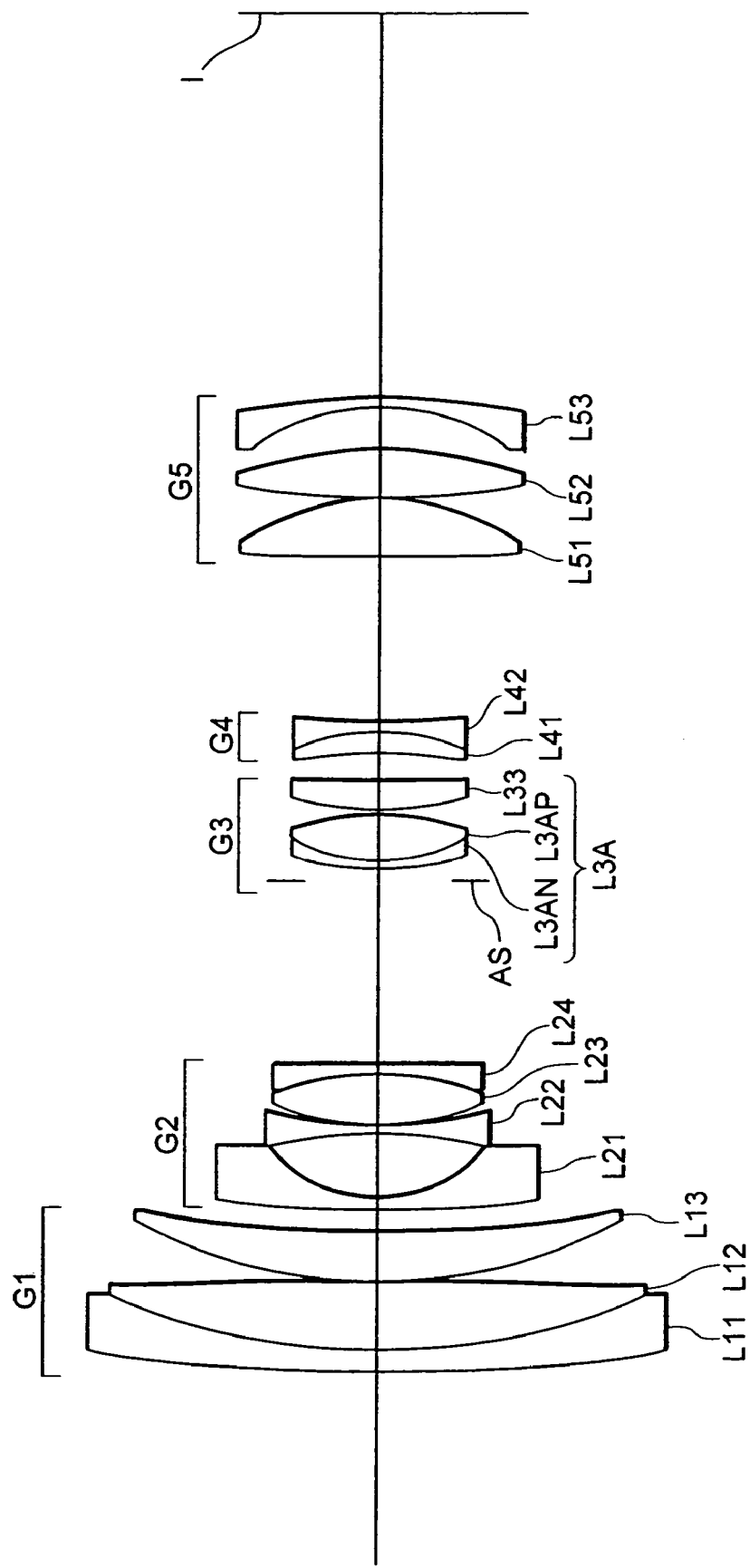
FIG. 9 is a diagram showing the lens arrangement of a vibration reduction zoom lens system according to Example 3 of the present invention.

FIG. 9 is a diagram showing the lens arrangement of a vibration reduction zoom lens system according to Example 3 of the present invention.

In a vibration reduction zoom lens system according to Example 3 of the present invention, the first lens group G1 is composed of, in order from the object, a cemented lens constructed by a negative meniscus lens L11 having a convex surface facing to the object and a positive meniscus lens L12 having a convex surface facing to the object, and a positive meniscus lens L13 having a convex surface facing to the object.

The second lens group G2 is composed of, in order from the object, a negative meniscus lens L21 having a convex surface facing to the object, a double concave negative lens L22, a double convex positive lens L23, and a negative meniscus lens L24 having a concave surface facing to the object.

The third lens group G3 is composed of, in order from the object, an aperture stop AS, a cemented lens L3A constructed by a negative meniscus lens L3AN having a convex surface facing to the object and a double convex positive lens L3AP, and a positive meniscus lens L33 having a convex surface facing to the object.

The fourth lens group G4 is composed of, in order from the object, a positive meniscus lens L41 having a concave surface facing to the object, and a double concave negative lens L42.

The fifth lens group G5 is composed of, in order from the object, a double convex positive lens L51, a double convex positive lens L52, and a negative meniscus lens L53 having a concave surface facing to the object.

Various values according to Example 3 are shown in Table 3.

TABLE 3

[Specification]

f = 24.715 mm–116.180 mm
FNO = 3.605–5.902
2ω = 84.27°–20.30°

[Lens Data]

| | r | d | ν | N(d) |
|---|---|---|---|---|
| 1) | 216.4404 | 1.9000 | 23.78 | 1.846660 |
| 2) | 64.1890 | 7.0000 | 52.32 | 1.755000 |

TABLE 3-continued

| | | | | |
|---|---|---|---|---|
| 3) | 41868.0830 | 0.1000 | | 1.000000 |
| 4) | 49.2996 | 4.8500 | 46.58 | 1.804000 |
| 5) | 114.2131 | d5 | | 1.000000 |
| *6) | 96.1218 | 0.0400 | 38.09 | 1.553890 |
| 7) | 85.6443 | 1.3500 | 42.72 | 1.834810 |
| 8) | 13.3745 | 6.5500 | | 1.000000 |
| 9) | −50.0350 | 0.9000 | 42.72 | 1.834810 |
| 10) | 39.7947 | 0.1000 | | 1.000000 |
| 11) | 25.5984 | 5.5000 | 25.68 | 1.784720 |
| 12) | −28.1577 | 0.1100 | | 1.000000 |
| 13) | −26.6982 | 0.9000 | 42.72 | 1.834810 |
| 14) | −10125.2810 | d14 | | 1.000000 |
| 15) | 32.5433 | 0.8000 | 25.43 | 1.805180 |
| 16) | 18.4480 | 4.7000 | 82.52 | 1.497820 |
| 17) | −32.0248 | 0.5000 | | 1.000000 |
| *18) | 27.2447 | 3.0000 | 63.98 | 1.513419 |
| 19) | 137.0245 | d19 | | 1.000000 |
| 20) | −74.9109 | 2.2500 | 23.78 | 1.846660 |
| 21) | −19.8416 | 0.0600 | | 1.000000 |
| 22) | −19.1953 | 0.8000 | 42.72 | 1.834810 |
| 23) | 84.8898 | d23 | | 1.000000 |
| 24) | 124.4234 | 6.4500 | 82.52 | 1.497820 |
| 25) | −25.2886 | 0.1000 | | 1.000000 |
| 26) | 76.9570 | 4.7000 | 70.41 | 1.487490 |
| 27) | −51.0732 | 4.3000 | | 1.000000 |
| 28) | −22.8139 | 1.1000 | 23.78 | 1.846660 |
| 29) | −66.6924 | Bf | | 1.000000 |

(Aspherical Data)

Surface Number 6

κ = −2.9054
$C_4$ = 4.5547E-6
$C_6$ = −4.3828E-9
$C_8$ = −3.8574E-11
$C_{10}$ = 7.1398E-14
$C_{12}$ = 1.2504E-16

Surface Number 18

κ = 0.9780
$C_4$ = −1.1742E-6
$C_6$ = 1.8701E-8
$C_8$ = −3.8781E-10
$C_{10}$ = 2.7920E-12
$C_{12}$ = −3.9268E-15

[Variable Distance upon Zooming (focusing at infinity)]

| f | 24.715 | 70.000 | 116.180 |
|---|---|---|---|
| d5 | 2.1645 | 22.0508 | 34.6978 |
| d14 | 19.9929 | 7.1483 | 3.2832 |
| d19 | 2.9356 | 15.9340 | 18.9269 |
| d23 | 16.9818 | 3.9834 | 0.9905 |
| Bf | 38.2859 | 51.2842 | 54.2772 |

[Various Values upon VR Correction]

| f | 24.715 mm | 70 mm | 116.18 mm |
|---|---|---|---|
| VR Lens Shift Amount (mm) | 0.3 | 0.3 | 0.3 |
| Image Shift (mm) | 0.408 | 0.599 | 0.654 |

[Values for the Conditional Expressions]

N3AN = 1.805180
N3AP = 1.497820
R1 = 32.543
R2 = −32.025
fW = 24.715
fT = 116.180
f1 = 83.611
f2 = −14.935
f3 = 26.381
f3A = 43.039
FT = 5.902
(1) |f3A/f3| = 1.631

TABLE 3-continued (2) |N3AN − N3AP| = 0.307360
(3) (R2 + R1)/(R2 − R1) = −0.008
(4) FT · f1/fT = 4.248
(5) |f2|/fW = 0.604

Figure 10A:
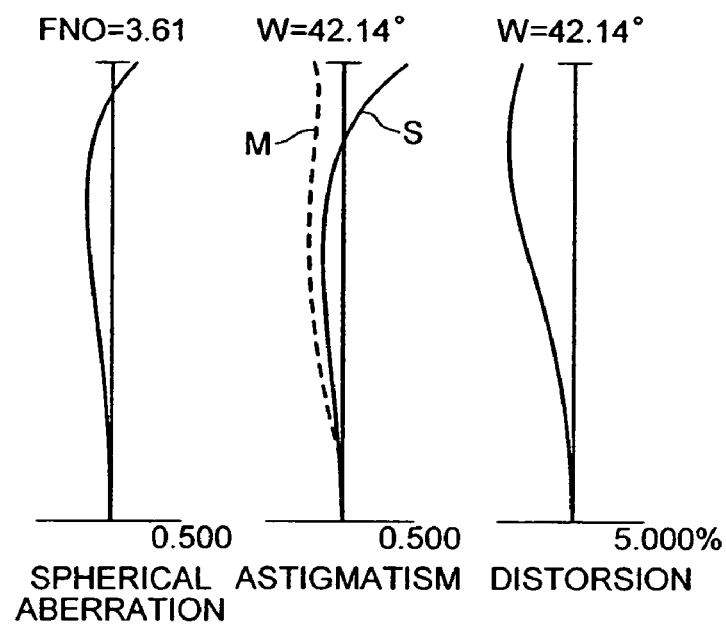
FIGS. 10A and 10B graphically show various aberrations of the vibration reduction zoom lens system according to Example 3 in the wide-angle end state when the zoom lens is focused at infinity, without and with vibration reduction correction, respectively.
Figure 10B:
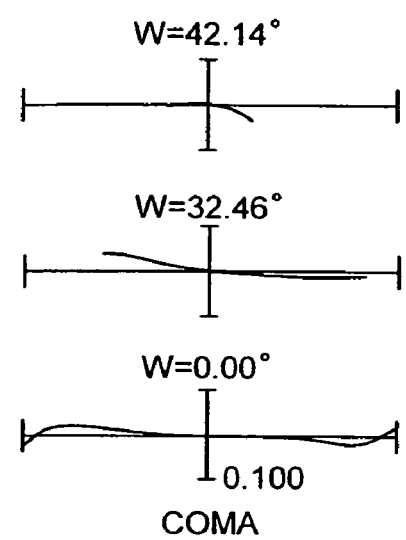
Figure 10B:
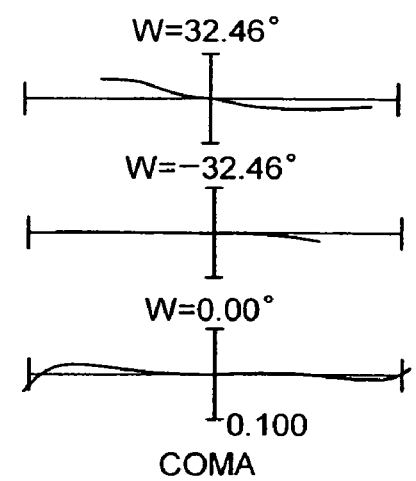
Figure 11A:
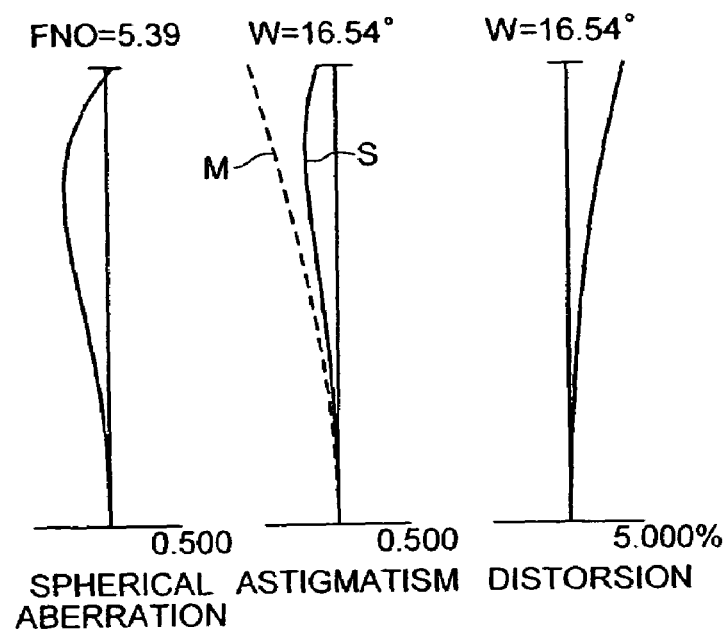
FIGS. 11A and 11B graphically show various aberrations of the vibration reduction zoom lens system according to Example 3 in the intermediate focal length state when the zoom lens is focused at infinity, without and with vibration reduction correction, respectively.
Figure 11B:
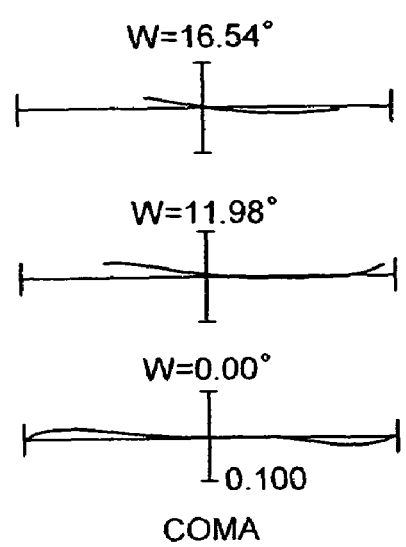
Figure 11B:
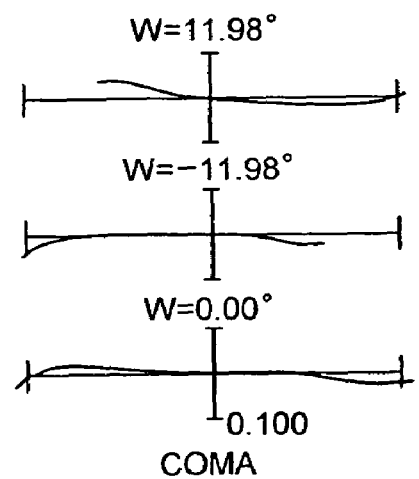
Figure 12A:
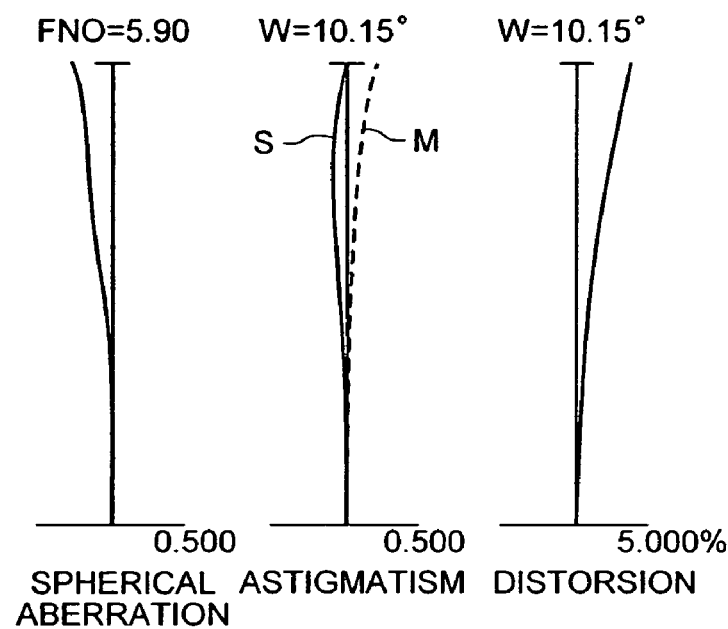
FIGS. 12A and 12B graphically show various aberrations of the vibration reduction zoom lens system according to Example 3 in the telephoto end state when the zoom lens is focused at infinity, without and with vibration reduction correction, respectively.
Figure 12B:
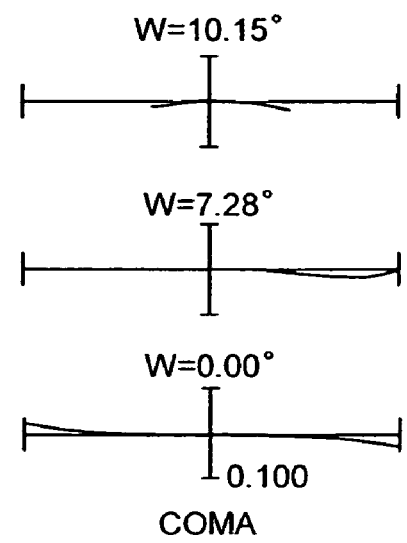
Figure 12B:
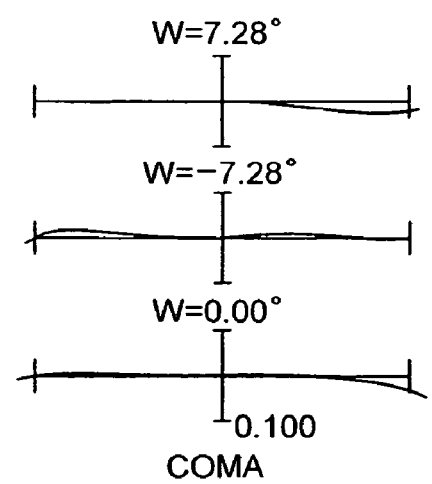

FIGS. 10, 11 and 12 graphically show various aberrations of the vibration reduction zoom lens system according to Example 3 at d-line ($\lambda$=587.6 nm).

FIGS. 10A and 10B graphically show various aberrations of the vibration reduction zoom lens system according to Example 3 in a wide-angle end state when the zoom lens is focused at infinity, without and with vibration reduction correction, respectively.

FIGS. 11A and 11B graphically show various aberrations of the vibration reduction zoom lens system according to Example 3 in an intermediate focal state when the zoom lens is focused at infinity, without and with vibration reduction correction, respectively.

FIGS. 12A and 12B graphically show various aberrations of the vibration reduction zoom lens system according to Example 3 in a telephoto end state when the zoom lens is focused at infinity, without and with vibration reduction correction, respectively.

As is apparent from the respective graphs, the vibration reduction zoom lens system according to Example 3 shows superb optical performance as a result of good corrections to various aberrations in each focal length state (the wide-angle end state, the intermediate focal length state, and the telephoto end state) with and without vibration reduction correction.

As described above, the present invention makes it possible to provide a vibration reduction zoom lens system having high optical performance and compactness suitable for an SLR camera, a video camera, and the like.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A vibration reduction zoom lens system comprising, in order from an object;
   a first lens group having positive refractive power;
   a second lens group having negative refractive power;
   a third lens group having positive refractive power;
   a fourth lens group having negative refractive power; and
   a fifth lens group having positive refractive power;
   all distances between adjacent lens groups being changed upon zooming from a wide-angle end state to a telephoto end state;
   the third lens group comprising a plurality of lenses including a cemented lens constructed by a negative lens and a positive lens;
   only the cemented lens being used as a vibration reduction lens shifting substantially perpendicularly to the optical axis for correcting camera shake; and
   the following conditional expression being satisfied:

$0.6<|f3A|/f3|<2.6$ where f3A denotes the focal length of the vibration reduction lens of the third lens group, and f3 denotes the focal length of the third lens group.

2. The vibration reduction zoom lens system according to claim 1, wherein the following conditional expression is satisfied:

$0.10<|N3AN-N3AP|$ where N3AN denotes a refractive index of a medium of the negative lens of the vibration reduction lens at d-line ($\lambda$=587.6 nm), and N3AP denotes a refractive index of a medium of the positive lens of the vibration reduction lens at d-line ($\lambda$=587.6 nm).

3. The vibration reduction zoom lens system according to claim 2, wherein the following conditional expression is satisfied:

$-0.50<(R2+R1)/(R2-R1)<0.50$ where R1 denotes a radius of curvature of the most object side lens surface of the vibration reduction lens, and R2 denotes a radius of curvature of the most image side lens surface of the vibration reduction lens.

4. The vibration reduction zoom lens system according to claim 3, wherein the following conditional expression is satisfied:

$3.0<FT \cdot f1/fT<5.5$ where fT denotes the focal length of the vibration reduction zoom lens system in the telephoto end state, f1 denotes the focal length of the first lens group, and FT denotes the f-number of the vibration reduction zoom lens system in the telephoto end state.

5. The vibration reduction zoom lens system according to claim 4, wherein the following conditional expression is satisfied:

$0.40<|f2|/fW<0.80$ where fW denotes the focal length of the vibration reduction zoom lens system in the wide-angle end state, and f2 denotes the focal length of the second lens group.

6. The vibration reduction zoom lens system according to claim 3, wherein the following conditional expression is satisfied:

$0.40<|f2|/fW<0.80$ where fW denotes the focal length of the vibration reduction zoom lens system in the wide-angle end state, and f2 denotes the focal length of the second lens group.

7. The vibration reduction zoom lens system according to claim 2, wherein the following conditional expression is satisfied:

$3.0<FT \cdot f1/fT<5.5$ where fT denotes the focal length of the vibration reduction zoom lens system in the telephoto end state, f1 denotes the focal length of the first lens group, and FT denotes the f-number of the vibration reduction zoom lens system in the telephoto end state.

8. The vibration reduction zoom lens system according to claim 7, wherein the following conditional expression is satisfied:

$0.40<|f2|/fW<0.80$ where fW denotes the focal length of the vibration reduction zoom lens system in the wide-angle end state, and f2 denotes the focal length of the second lens group.

9. The vibration reduction zoom lens system according to claim 2, wherein the following conditional expression is satisfied:

$0.40<|f2|/fW<0.80$ where fW denotes the focal length of the vibration reduction zoom lens system in the wide-angle end state, and f2 denotes the focal length of the second lens group.

10. The vibration reduction zoom lens system according to claim 1, wherein the following conditional expression is satisfied:

$$-0.50<(R2+R1)/(R2-R1)<0.50$$

where R1 denotes a radius of curvature of the most object side lens surface of the vibration reduction lens, and R2 denotes a radius of curvature of the most image side lens surface of the vibration reduction lens.

11. The vibration reduction zoom lens system according to claim 10, wherein the following conditional expression is satisfied:

$$3.0<FT \cdot f1/fT<5.5$$

where fT denotes the focal length of the vibration reduction zoom lens system in the telephoto end state, f1 denotes the focal length of the first lens group, and FT denotes the f-number of the vibration reduction zoom lens system in the telephoto end state.

12. The vibration reduction zoom lens system according to claim 11, wherein the following conditional expression is satisfied:

$$0.40<|f2|/fW<0.80$$

where fW denotes the focal length of the vibration reduction zoom lens system in the wide-angle end state, and f2 denotes the focal length of the second lens group.

13. The vibration reduction zoom lens system according to claim 10, wherein the following conditional expression is satisfied:

$$0.40<|f2|/fW<0.80$$

where fW denotes the focal length of the vibration reduction zoom lens system in the wide-angle end state, and f2 denotes the focal length of the second lens group.

14. The vibration reduction zoom lens system according to claim 1, wherein the following conditional expression is satisfied:

$$3.0<FT \cdot f1/fT<5.5$$

where fT denotes the focal length of the vibration reduction zoom lens system in the telephoto end state, f1 denotes the focal length of the first lens group, and FT denotes the f-number of the vibration reduction zoom lens system in the telephoto end state.

15. The vibration reduction zoom lens system according to claim 14, wherein the following conditional expression is satisfied:

$$0.40<|f2|/fW<0.80$$

where fW denotes the focal length of the vibration reduction zoom lens system in the wide-angle end state, and f2 denotes the focal length of the second lens group.

16. The vibration reduction zoom lens system according to claim 1, wherein the following conditional expression is satisfied:

$$0.40<|f2|/fW<0.80$$

where fW denotes the focal length of the vibration reduction zoom lens system in the wide-angle end state, and f2 denotes the focal length of the second lens group.

17. A method for forming an image of an object and varying a total focal length by a lens system that comprises, in order from the object, a first lens group having positive refractive power, a second lens group having negative refractive power, a third lens group having positive refractive power, a fourth lens group having negative refractive power, and a fifth lens group having positive refractive power, said method comprising the steps of:

varying the total focal length by changing all distances between adjacent lens groups being moved upon zooming from a wide-angle end state to a telephoto end state;

correcting for a vibration of the lens system by using only a cemented lens of the third lens group as a vibration reduction lens, the cemented lens including a negative lens and a positive lens, and shifting in a direction substantially perpendicular to an optical axis of the lens system to correct for the vibration; and satisfying the following conditional expression:

$$0.6<|f3A|/|f3|<2.6$$

where f3A denotes the focal length of the cemented lens of the third lens group, and f3 denotes the focal length of the third lens group.

18. The method according to claim 17, further comprising the step of:

satisfying the following conditional expression:

$$0.10<|N3AN-N3AP|$$

where N3AN denotes a refractive index of a medium of the negative lens of the vibration reduction lens at d-line ($\lambda$=587.6 nm), and N3AP denotes a refractive index of a medium of the positive lens of the vibration reduction lens at d-line ($\lambda$=587.6 nm).

19. The method according to claim 17, further comprising the step of:

satisfying the following conditional expression:

$$-0.50<(R2+R1)/(R2-R1)<0.50$$

where R1 denotes a radius of curvature of the most object side lens surface of the vibration reduction lens, and R2 denotes a radius of curvature of the most image side lens surface of the vibration reduction lens.

20. The method according to claim 17, further comprising the step of:

satisfying the following conditional expression:

$$3.0<FT \cdot f1/fT<5.5$$

where fT denotes the focal length of the lens system in the telephoto end state, f1 denotes the focal length of the first lens group, and FT denotes the f-number of the lens system in the telephoto end state.

21. The method according to claim 17, further comprising the step of:

satisfying the following conditional expression:

$$0.4<|f2|/fW<0.8$$

where fW denotes the focal length of the lens system in the wide-angle end state, and f2 denotes the focal length of the second lens group.

* * * * *

UNITED STATES PATENT AND TRADEMARK OFFICE
CERTIFICATE OF CORRECTION

| | | |
|---|---|---|
| PATENT NO. | : 7,209,299 B2 | Page 1 of 1 |
| APPLICATION NO. | : 11/363084 | |
| DATED | : April 24, 2007 | |
| INVENTOR(S) | : Masayuki Aoki (Deceased) and Misako Aoki (Legal Rep.) | |

It is certified that error appears in the above-identified patent and that said Letters Patent is hereby corrected as shown below:

On the title page item (75), the inventorship information should read:
--Masayuki Aoki, deceased, late of Oyama (JP); by Misako Aoki, legal representative, Oyama (JP)--.

Signed and Sealed this

Sixth Day of May, 2008

JON W. DUDAS
*Director of the United States Patent and Trademark Office*